(12) United States Patent
Singh et al.

(10) Patent No.: US 7,535,909 B2
(45) Date of Patent: May 19, 2009

(54) METHOD AND APPARATUS TO PROCESS PACKETS IN A NETWORK

(75) Inventors: Sumeet Singh, Fremont, CA (US); George Varghese, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 459 days.

(21) Appl. No.: 11/271,209

(22) Filed: Nov. 9, 2005

(65) Prior Publication Data

US 2006/0098687 A1 May 11, 2006

Related U.S. Application Data

(60) Provisional application No. 60/522,810, filed on Nov. 9, 2004.

(51) Int. Cl.
 *H04L 12/28* (2006.01)
(52) U.S. Cl. ..................... 370/395.1; 726/13
(58) Field of Classification Search ............... 370/242, 370/389, 392, 395.1, 395.52, 412, 429; 726/11, 726/13, 26, 30
 See application file for complete search history.

(56) References Cited

U.S. PATENT DOCUMENTS

| | | | | |
|---|---|---|---|---|
| 4,734,856 | A * | 3/1988 | Davis | 706/62 |
| 6,279,113 | B1 | 8/2001 | Vaidya | |
| 6,519,703 | B1 | 2/2003 | Joyce | |
| 7,130,981 | B1 | 10/2006 | Nachenberg | |
| 7,251,692 | B1 | 7/2007 | Raz | |
| 7,451,309 | B2 | 11/2008 | Aaron et al. | |
| 2002/0129140 | A1 | 9/2002 | Peled et al. | |
| 2003/0004689 | A1* | 1/2003 | Gupta et al. | 702/188 |
| 2003/0067921 | A1 | 4/2003 | Sivalingham | |
| 2003/0145232 | A1* | 7/2003 | Poletto et al. | 713/201 |
| 2003/0226035 | A1 | 12/2003 | Robert et al. | |
| 2004/0054925 | A1 | 3/2004 | Etheridge et al. | |
| 2004/0117648 | A1 | 6/2004 | Kissel | |
| 2004/0215976 | A1 | 10/2004 | Jain | |
| 2004/0257994 | A1 | 12/2004 | Paskett et al. | |
| 2005/0041955 | A1 | 2/2005 | Beuque | |
| 2005/0060535 | A1 | 3/2005 | Bartas | |
| 2005/0060754 | A1 | 3/2005 | Simyon | |
| 2005/0076228 | A1 | 4/2005 | Davis et al. | |
| 2005/0111367 | A1 | 5/2005 | Jonathan Chao et al. | |
| 2005/0114700 | A1 | 5/2005 | Barrie et al. | |
| 2005/0229254 | A1 | 10/2005 | Singh et al. | |

(Continued)

*Primary Examiner*—Chirag G Shah
*Assistant Examiner*—Yong Zhou
(74) *Attorney, Agent, or Firm*—Schwegman, Lundberg & Woessner, P.A.

(57) ABSTRACT

A method and apparatus is described to process packets in a network. The method may comprise receiving the packet and determining a length K of the packet. If the length of the packet is less than a reference length M then no analysis may be performed on the packet. However, if the packet length K is not less than M, the method may determine if the packet length K is at least greater than a reference window size $W_{Ref}$. When the packet length is greater than $W_{Ref}$ then a window size W for the processing of the packets is set equal to $W_{Ref}$; and the packet length is less than $W_{Ref}$ then a window size W for the processing of the packets is set equal to the packet size K. Thereafter, the packet is processed using the window size W.

20 Claims, 4 Drawing Sheets

U.S. PATENT DOCUMENTS

| | | |
|---|---|---|
| 2005/0262556 A1 | 11/2005 | Waisman et al. |
| 2005/0262561 A1* | 11/2005 | Gassoway .................. 726/22 |
| 2006/0048209 A1 | 2/2006 | Shelest et al. |
| 2006/0064746 A1 | 3/2006 | Aaron et al. |
| 2006/0072464 A1 | 4/2006 | Aaron et al. |
| 2006/0098585 A1 | 5/2006 | Singh et al. |
| 2006/0107318 A1 | 5/2006 | Jeffries et al. |
| 2006/0117126 A1 | 6/2006 | Leung, Jr. et al. |
| 2006/0139187 A1 | 6/2006 | Helfman et al. |
| 2006/0150249 A1 | 7/2006 | Gassen et al. |
| 2006/0161986 A1 | 7/2006 | Singh et al. |
| 2007/0025243 A1 | 2/2007 | Ayyagari et al. |
| 2007/0047457 A1 | 3/2007 | Harijono et al. |
| 2008/0140631 A1 | 6/2008 | Pandya |
| 2008/0140912 A1 | 6/2008 | Pandya |
| 2008/0140991 A1 | 6/2008 | Pandya |
| 2008/0219178 A1 | 9/2008 | Barrett |

* cited by examiner

METHOD AND APPARATUS TO PROCESS PACKETS IN A NETWORK

CLAIM OF PRIORITY

This patent application claims the benefit of priority, under 35 U.S.C. Section 119(e), to U.S. Provisional Patent Application Ser. No. 60/522,810, filed on Nov. 9, 2004, the entire content of which is incorporated herein by reference.

TECHNICAL FIELD

This application relates to a method and apparatus to process packets communicated in a network.

BACKGROUND

A packet or datagram is a piece of a message transmitted over a packet-switching network. An example of a packet-switching network is the Internet where enormous quantities of data are communicated between various network points. In the Internet environment, content to be communicated between two endpoints is broken up into packets and these packets may follow different paths whilst travelling between the endpoints. It will be appreciated that the content of packets may be ordinary or anomalous.

An example of anomalous content in a packet is data that repeats with high frequency, such as the data associated with viruses, computer worms, or the like. In these circumstances, it may be advantageous to identify anomalous content in packets and then monitor subsequent packets for the anomalous content. Anomalous content in a packet may be identified by a "signature" or sequence of bytes that is present in the content. Then, all subsequent packets are checked to see if the signature is present and, if so, appropriate action may be taken to reduce any negative effects of the anomalous packet on the network.

BRIEF DESCRIPTION OF DRAWINGS

The present application is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiment of the present application. It will be evident, however, to one skilled in the art that the present invention may be practiced without these specific details.

Figure 1:
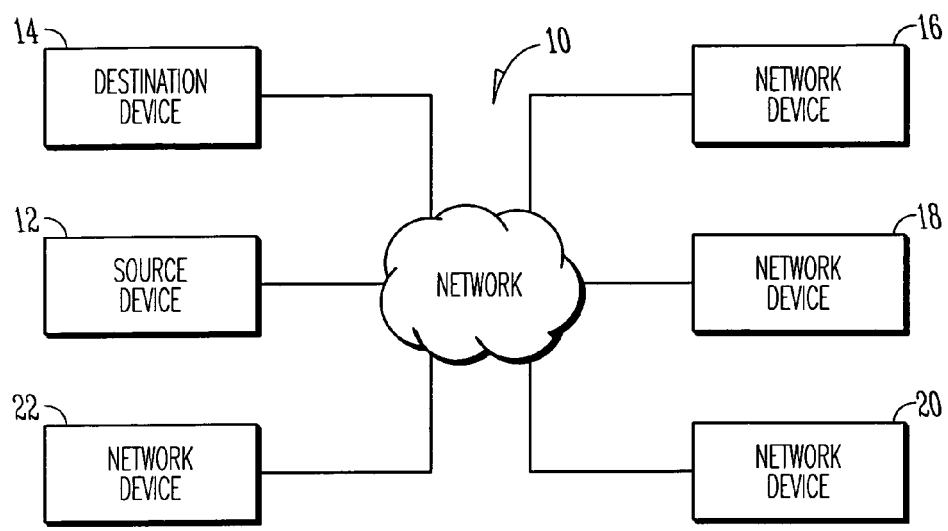
FIG. 1 shows an example network including a plurality of network devices.
Figure 2:
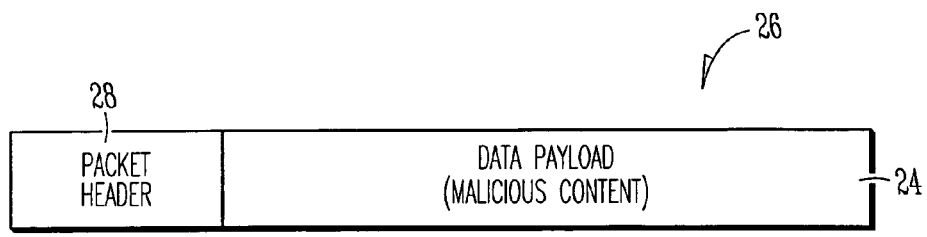
FIG. 2 shows an example packet used to communicate in the network of FIG. 1.

FIG. 1 shows an example network 10 interconnecting a plurality of network devices (e.g., routers, switches, client devices, servers, and so on). It will be appreciated that, by way of example, a source device 12 may spread malicious content 24 in a data payload of a packet 26 (see FIG. 2). A packet header 28 of the packet 26 may include a destination IP address and the source device 12 may send packets to a destination network device 14. It will be appreciated that many other network devices 16-22 may be provided and that the devices shown in FIG. 1 are merely by way of example. The packet 26 may have number of different signatures which may vary in uniqueness.

Figure 3:
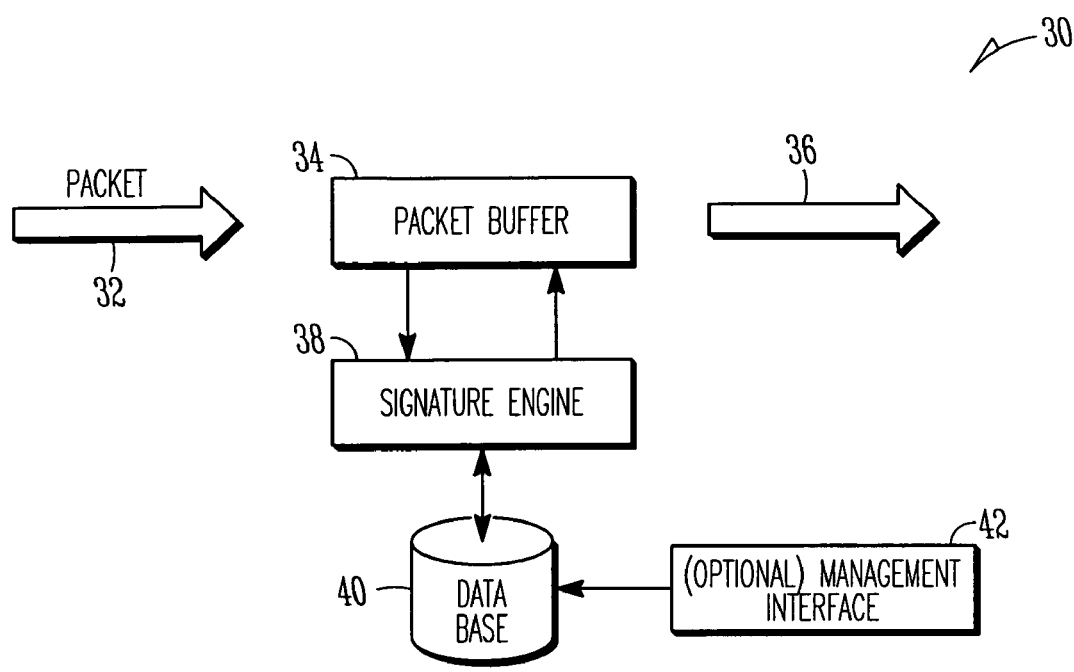
FIG. 3 shows apparatus, in accordance with an example embodiment, to process a packet in a network.

FIG. 3 shows apparatus 30, in accordance with an example embodiment, to process potentially malicious content in a packet. For example, the apparatus 30 may be included in a router, a switch, or any other electronic device that processes packets. The apparatus 30 may include a packet buffer 34 to receive packets 26 from and send packets 26 to a plurality of different network devices (see FIG. 1 and arrows 32 and 36 in FIG. 3). The packets 26 may be fed into a signature processing engine 38 which may then classify potentially malicious content that may be evidence of a malicious network attack. When a malicious attack is detected, the signature processing engine 38 may store packet data, source and destination IP addresses, or the like in the database 40. An optional management interface 42 may be provided to manage the apparatus 30.

Dealing with Small Packets

In order to evade detection methodologies, small packets may be used in a network attack. Embodiments of the detection engine described herein may be required to identify content when a signature of the attack is of a selected minimum length. For example, any consecutive set of two bytes in any packet were tracked, in a large stream of packets (which is common at high speeds) repetitions will be very common because there are only 64,000 different patterns that are 2 bytes in length. On the other hand, if frequent content that is at least 20 bytes is tracked, the likelihood of content repeat is lower. Thus, in order to avoid false positives, patterns or signatures may be tracked which are at least N consecutive bytes long where N is sufficiently high to reduce the number of false positives.

There are however many examples of malicious packets used for command-and-control by malicious nodes that control bots using small packets. These small packets may, for example, merely instruct or command a bot to send an attack now to an address "X". It will be appreciate that such commands can be encoded in small space in a packet payload. Because of existing infections that have commandeered vast armies of bots worldwide it may be important to determine these bots because these bots could be used as the foot-soldiers of the next big attack. Unfortunately, if the length L of the packets used to control bots is less than N the minimum length window of a content detection engine, the bot packet will not be detected.

In an example embodiment, consecutive content of N bytes or more (subject to sampling to reduce load) may be tracked and, in addition, a whole packet whose content length L lies between M and N, where M is a minimum length is also tracked. Thus for large packets, the large window size N is still used. However, for packets above size M the example embodiment tracks the whole packet. The reason to have a minimum size packet is because very small packets (e.g., a packet whose packet content length is 1 byte) lead to very high false positive rates in real traffic.

Mechanistically, this change can be easily added to the previous legacy systems as follows. The main change is that for packets of content length between M and N we need to keep track of a content string of variable length. This may be performed using the teaching of US Publication 20050229254 entitled "DETECTING PUBLIC NETWRK ATTACKS USING SIGNATURES AND FIRST CONTENT ANALYSIS" the entire content of which is incorporated herein by reference.

In an unscalable embodiment, the entire content string is kept and the there is no extra complexity in keeping track of variable length content strings. In the scalable embodiment, a hash function is provided to create a hash value of the same size of the content on any length from M to N.

In an embodiment, the processing may then follow as described in the abovementioned published application. In another embodiment, unlike the teachings of the abovementioned published application, a separate hash table or multistage filter may be used to prune out or exclude frequent content for situations where the packet length is small (e.g., a packet including content between M and N in length) to avoid such content (if frequent) from polluting the multistage filter of the content of exactly N bytes. However, if M is at least the length of the hash value, even this may not be required.

Figure 4:
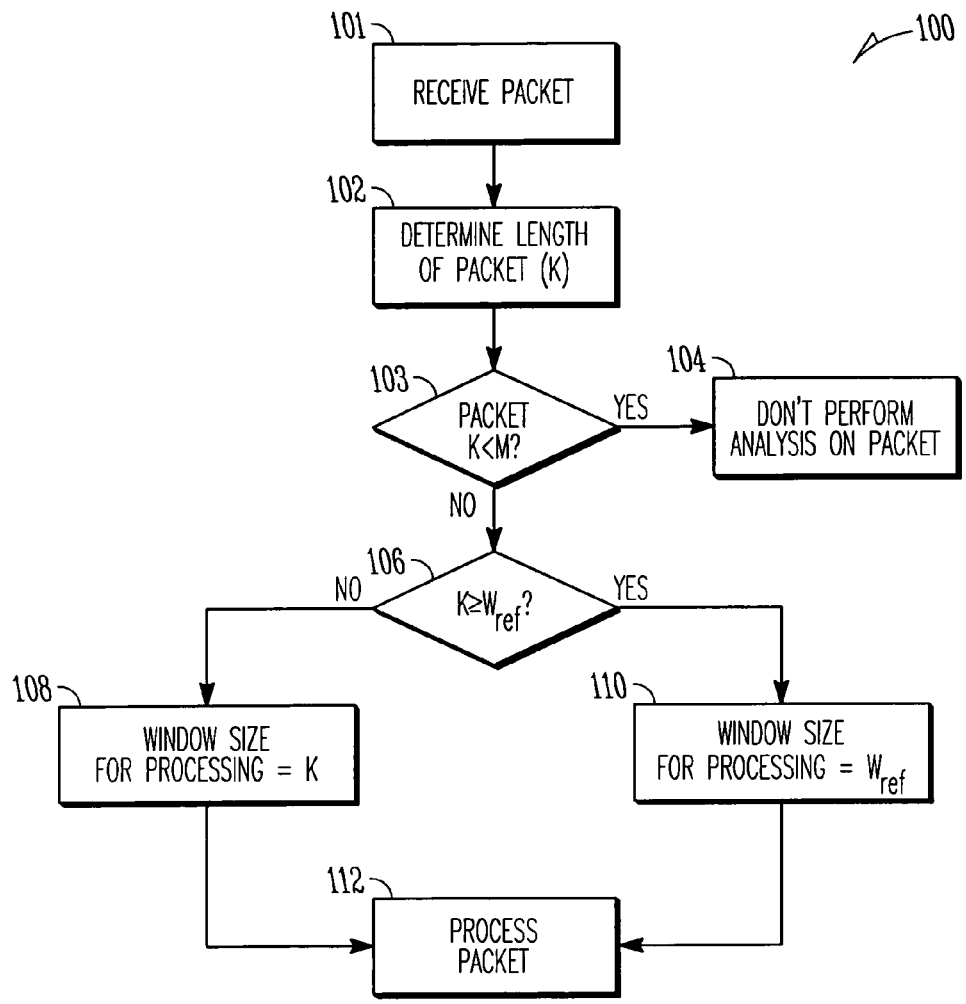
FIG. 4 shows method, in accordance with an example embodiment, to process small packets in a network.

FIG. 4 shows an example method 100 to perform the abovementioned functionality as is described by way of example with reference to the signature engine 38. As shown at block 101 a packet is received by the signature engine 38 and, thereafter the length K of the packet is determined (see block 102). If the length of the packet is less than a reference length M (see block 103) then no analysis may be performed on the packet (see block 104). If, however, the packet length is not less than M, a determination is made at block 106 to see if the packet length K is greater than or equal to a reference window size $W_{Ref}$. If the packet length is greater than $W_{Ref}$, then a window size for the processing of the packets is set equal to $W_{Ref}$ (see block 110). If the packet length is less than $W_{Ref}$ then a window size for the processing of the packets is set equal to the packet size K (see block 108). Thereafter, the packet may be processed. For example, the packet may be processed as described in the abovementioned publication.

Thus, for packets of content size less than the window size N and more than a minimum size M, in an example embodiment the entire variable-size content in the packet is considered to compute a signature. Also, in the scalable version, an additional data structure (e.g., hash table, multi-stage filter) may be used to prune out the frequent content of whole packets whose content length is between M and N bytes.

Value Sampling

Value sampling involves probabilistically reducing the number of signatures which are sent to the downstream entity to reduce the workload which it needs to do. When a signature passes value sampling it may be written into a FIFO which is read out every 8 cycles. In the case that every signature passes value sampling the FIFO will be being written every cycle causing it to fill up very rapidly and forcing it to drop deterministically chosen signatures which should have been passed through.

In an embodiment the following method is used to address this problem. First, a maximum number of signature per packet are written to the FIFO based on the payload length of the packet. Using this we can ensure that the FIFO will be emptied by the time the next packet's payload arrives to ensure that each individual packet will be value sampled deterministically. Second, since there are a limited number of signatures which are sampled for each packet, it is more beneficial for the signatures to be spaced out evenly throughout the packet. To achieve this, in an embodiment a minimum distance between value sampled signatures can be specified. This means that once a signature has been value sampled, it will be at least this minimum number of bytes before the next signature will pass value sampling.

Configurable Counter Widths for Multistage Filters

Depending on the arrival rate and characteristics of the traffic flow, in an embodiment it may be more optimal to have a greater number of bins in the MultiStageFilters (MSFs) with a smaller counter width and in another it may be better to have fewer bins with larger counters. This embodiment may allow dynamical changing of an MSF configuration through software without having to change the underlying hardware and physical memory size.

The memory line width will be designed in such a way to support the maximum length counter plus one bit for state which is used for clearing the counters. For example, if the maximum counter width is x, each ram line will have a width of x+1. The size of the counter can then be scaled by a factor of x where x is a power of 2. The width of each counter is then divided by x and the total number of counters will be multiplied by x. In this case, each ram line now contains one state bit and x number of counters. When the counter lookup is done in each stage of the multistage filters, the bits of the signature which are used for the address which is updated will now be right shifted by x, and the x LSBs of the signature will be used to choose the counter within the line which is chosen. The same state bit can now be used for clearing multiple counters saving memory in comparison with the case when each counter is stored in a separate address.

Using Single Bit Per Entry to Clear Multistage Filter

The counters in the Multistage filters need to be reset synchronously with one another. These counters may be stored in either on-chip or off chip RAM which cannot be synchronously reset. In order to reset each line, normally a state machine would have to step through each address writing 0s. Using this technique all other accesses to the multistage filters would have to stop while the clearing was taking place. This may be unacceptable in most applications. In an example embodiment, one state bit is stored in each ram address line (each line can contain one or more counters). This current state is then kept in a central location by the logic which is accessing the multistage filter. When writes are performed, the current state is written to the state bit for the entry. When a read is done to an address in the MSF, the state bit which is read is compared to the current state and if they do not match, the counter which is read is treated as being equal to the initial value. In this way, by simply changing the state in one central location, it appears that all the counters in the MSF are reset synchronously. After a state change occurs, a background task can then sequentially read each address in the RAM. If the state bit hasn't already been update to the current state, it then can set the state bit to the current state and initialize the counter value. In this way, continuous access can be maintained for the MSF, and the only limitation is that a state change must not occur in a time period shorter than it takes to access and update the state of each entry by the background task.

Parallel Access to Multistage Filter and Content Dispersion Table

The prevalence multistage filters are used to determine which content signatures are occurring abnormally often in the traffic stream. When the counter for a signature crosses a pre-determined prevalence threshold level, it is added to the content dispersion table for closer tracking. In order minimize the number of cycle which it takes to process each signature, the lookup in the multistage filters and content dispersion block are done in parallel. While the signature is being compared to the content dispersion table entry (which takes longer since it is stored in off chip SRAM), the read and updating of the counters in the MSF is proceeding as normal. If the entry is found in the dispersion table, a hit signal is send to the prevalence filter which blocks the writing back of the updated counters to the MSF. This may prevent signatures which are already being tracked in the content dispersion table from polluting the prevalence filter. The addition of an entry to the content dispersion table works in much the same way but in the opposite direction. By the time the outbreak detector determines that a signature needs to be added to the dispersion table and can send its add signal, the entry has already been read and the state machine has determined whether or not a new entry can be created at that location. If the location is free, the write can immediately be performed for the new entry.

Figure 5:
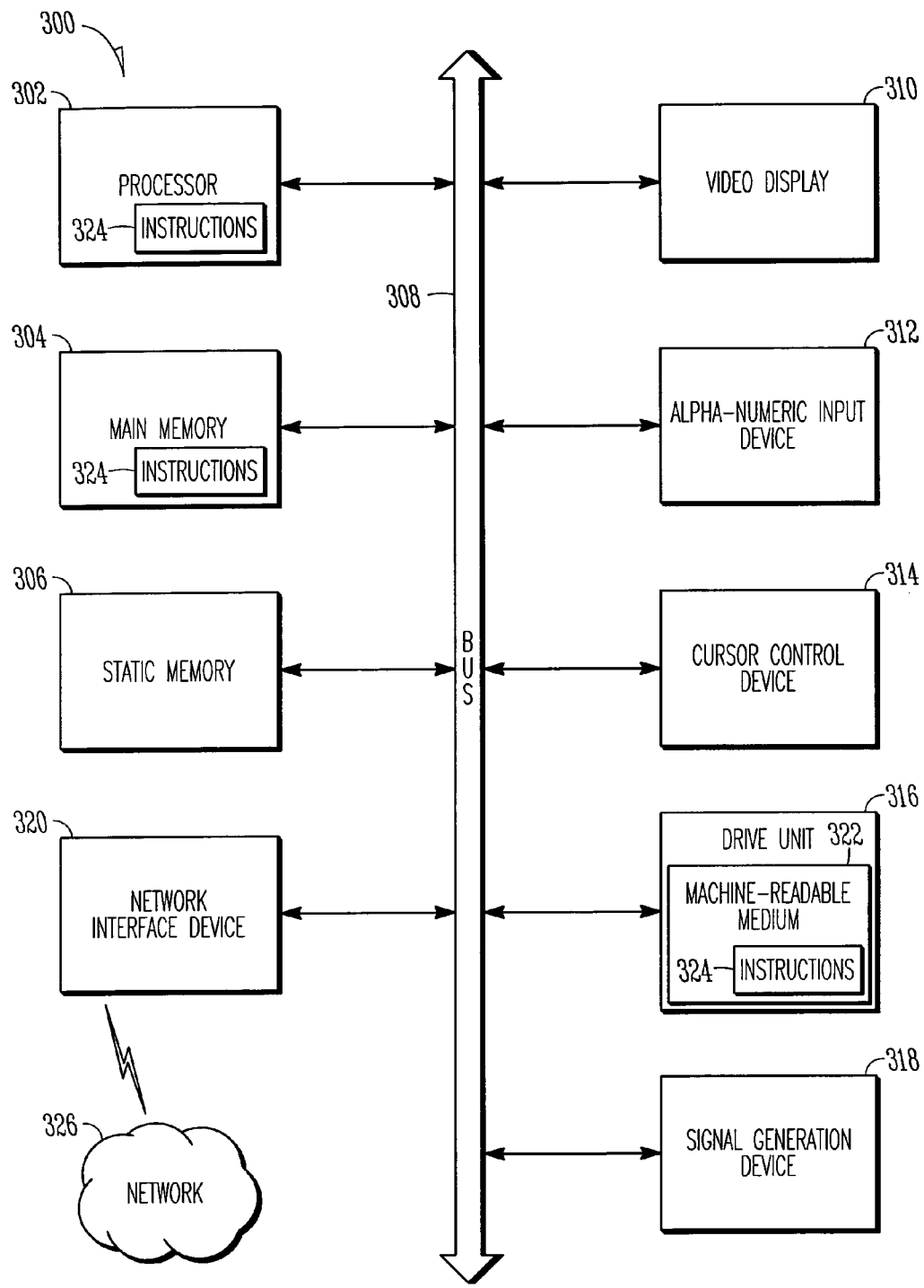
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of machine in the example form of a computer system 300 within which a set of instructions, for causing the machine to perform any one or more of the methodologies discussed herein, may be executed. It will be appreciated that some of the components of the computer system 300 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to process packets in a network, the method comprising:
   receiving a packet;
   determining a length K of the packet;
      if the length of the packet is less than a reference length M, performing no analysis on the packet;
      if the packet length K is not less than M, determining if the packet length K is greater than a reference window size $W_{Ref}$ wherein
         if the packet length is greater than or equal to $W_{Ref}$, then a window size W for processing of the packets is set equal to $W_{Ref}$; and
         if the packet length is less than $W_{Ref}$, then a window size W for processing of the packets is set equal to the packet size K; and
   processing the packets by a signature processing engine using the window size W.

2. The method of claim 1, wherein processing the packets comprises checking the packets for presence of a signature of potentially malicious content.

3. The method of claim 2, further comprising storing packet data in a data base if potentially malicious content is detected.

4. The method of claim 3, further comprising using a management interface to manage the data base.

5. The method of claim 2, further comprising storing source and destination addresses for the packets in a data base if potentially malicious content is detected.

6. The method of claim 1, further comprising using a data structure to prune out frequent content of whole packets whose content length is between M and N bits, wherein N is equal to the window size W.

7. The method of claim 6, wherein the data structure comprises one of a hash table and a multistage filter.

8. The method of claim 1, wherein a packet comprises a plurality of value-sampled signatures, the method further comprising:
   writing a maximum number of signatures to a first-in first-out (FIFO) element, based on a payload length of the packet; and
   specifying a minimum distance between value-sampled signatures.

9. Apparatus to detect potentially malicious content within a packet, the apparatus comprising a signature processing engine including:
- a first component to receive a packet;
- a second component to determine a length K of the packet;
    - if the length of the packet is less than a reference length M, then the determining second component to perform no analysis on the packet;
    - if the packet length K is not less than M, then the determining second component to determine if the packet length K is greater than a reference window size $W_{Ref}$ wherein
        - if the packet length is greater than or equal to $W_{Ref}$, then a window size W for processing of the packets is set equal to $W_{Ref}$; and
        - if the packet length is less than $W_{Ref}$, then a window size W for processing of the packets is set equal to the packet size K; and
- a third component to process the packets using the window size W.

10. The apparatus of claim 9, wherein the signature processing engine checks packets for a presence of a signature of potentially malicious content.

11. The apparatus of claim 10, wherein the signature processing engine stores packet data in a data base if potentially malicious content is detected.

12. The apparatus of claim 10, wherein the signature processing engine stores source and destination addresses for the packets in a data base if potentially malicious content is detected.

13. The apparatus of claim 9, further comprising a data structure to prune out frequent content of whole packets whose content length is between M and N bits, wherein N is equal to the window size W.

14. The apparatus of claim 13, wherein the data structure comprises one of a hash table and a multistage filter.

15. The apparatus of claim 9, wherein a packet comprises a plurality of value-sampled signatures, and wherein the signature processing engine is further to:
- write a maximum number of signatures to a first-in first-out (FIFO) element, based on a payload length of the packet; and
- specify a minimum distance between value-sampled signatures.

16. The apparatus of claim 9, further comprising one of a router, a switch, and a bridge.

17. The apparatus of claim 9, further comprising a packet buffer, coupled to the signature processing engine, to receive packets from a network device.

18. The apparatus of claim 9, further comprising a data base, coupled to the signature processing engine, to store packet data.

19. The apparatus of claim 18, further comprising a management interface, coupled to the data base, to manage the data base.

20. Apparatus to detect potentially malicious content within packets in a network, the apparatus comprising:
- means for receiving a packet;
- means for determining a length K of the packet;
    - if the length of the packet is less than a reference length M, the apparatus performing no analysis on the packet;
    - if the packet length K is not less than M, the apparatus determining if the packet length K is greater than a reference window size $W_{Ref}$ wherein
        - if the packet length is greater than or equal to $W_{Ref}$, then a window size W for processing of the packets is set equal to $W_{Ref}$; and
        - if the packet length is less than $W_{Ref}$, then a window size W for processing of the packets is set equal to the packet size K; and
- means for processing the packets using the window size W.

* * * * *

UNITED STATES PATENT AND TRADEMARK OFFICE
CERTIFICATE OF CORRECTION

| | | |
|---|---|---|
| PATENT NO. | : 7,535,909 B2 | Page 1 of 1 |
| APPLICATION NO. | : 11/271209 | |
| DATED | : May 19, 2009 | |
| INVENTOR(S) | : Sumeet Singh et al. | |

It is certified that error appears in the above-identified patent and that said Letters Patent is hereby corrected as shown below:

In column 3, line 6, delete "NETWRK" and insert -- NETWORK --, therefor.

In column 3, line 11, before "there" delete "the".

In column 6, line 35, in Claim 1, delete "$W_{Ref};$" and insert -- $W_{Ref},$ --, therefor.

Signed and Sealed this

Twenty-eighth Day of July, 2009

JOHN DOLL
*Acting Director of the United States Patent and Trademark Office*